US008428809B2

(12) United States Patent
Roberts et al.

(10) Patent No.: US 8,428,809 B2
(45) Date of Patent: Apr. 23, 2013

(54) MULTI-STEP VALVE LIFT FAILURE MODE DETECTION

(75) Inventors: Alexander J. Roberts, Commerce Township, MI (US); Kenneth J. Cinpinski, Ray, MI (US); Donovan L. Dibble, Utica, MI (US)

(73) Assignee: GM Global Technology Operations LLC

( * ) Notice: Subject to any disclaimer, the term of this patent is extended or adjusted under 35 U.S.C. 154(b) by 1249 days.

(21) Appl. No.: 12/028,959

(22) Filed: Feb. 11, 2008

(65) Prior Publication Data

US 2009/0204283 A1    Aug. 13, 2009

(51) Int. Cl.
G01M 17/00 (2006.01)
G01M 15/00 (2006.01)
B60T 7/12 (2006.01)
G06F 19/00 (2011.01)
F01L 1/34 (2006.01)
F02M 35/00 (2006.01)
F02M 69/54 (2006.01)
F02B 37/12 (2006.01)

(52) U.S. Cl.
USPC ......... 701/29.2; 701/29.1; 701/109; 701/114; 123/90.15; 123/184.53; 123/463; 73/114.32; 73/114.33; 73/114.37

(58) Field of Classification Search .................... 701/29, 701/102–105, 109, 114; 700/54; 123/463, 123/90.12–90.17, 90.55, 184.21, 184.22, 123/184.53–184.55, 188.14, 308, 321, 322, 123/346–348, 429–432; 73/114.31–114.37
See application file for complete search history.

(56) References Cited

U.S. PATENT DOCUMENTS

| 5,675,080 | A | * | 10/1997 | Wada ........................ 73/114.74 |
| 6,032,656 | A | * | 3/2000 | Itoyama et al. .......... 123/568.21 |
| 6,170,469 | B1 | * | 1/2001 | Itoyama et al. ............... 123/480 |
| 6,230,697 | B1 | * | 5/2001 | Itoyama et al. .......... 123/568.21 |
| 6,401,684 | B2 | * | 6/2002 | Hori et al. .................. 123/198 F |
| 6,405,697 | B2 | * | 6/2002 | Mikame ..................... 123/90.18 |
| 6,491,022 | B2 | * | 12/2002 | Okamoto ...................... 123/396 |
| 6,513,467 | B2 | * | 2/2003 | Nohara et al. ............. 123/90.15 |
| 6,561,150 | B1 | * | 5/2003 | Kikuoka et al. ........... 123/90.18 |
| 6,588,257 | B1 | * | 7/2003 | Wild et al. ................. 73/114.13 |
| 6,626,164 | B2 | * | 9/2003 | Hitomi et al. ................. 123/679 |
| 6,871,632 | B2 | * | 3/2005 | Henn et al. ..................... 123/399 |
| 7,086,381 | B2 | * | 8/2006 | Machida et al. .............. 123/405 |
| 7,139,655 | B2 | * | 11/2006 | Nakazawa et al. ............ 701/102 |
| 7,146,851 | B2 | * | 12/2006 | Wakahara et al. ......... 73/114.72 |
| 7,151,994 | B2 | * | 12/2006 | Fuwa ............................ 701/114 |
| 7,159,548 | B2 | * | 1/2007 | Shindou ..................... 123/90.16 |

(Continued)

FOREIGN PATENT DOCUMENTS

JP        2008-19818       1/2008

*Primary Examiner* — James Trammell
*Assistant Examiner* — Majdi Alsomiri

(57) ABSTRACT

A method of valve lift failure detection may include determining first and second intake air pressures in an engine having intake valve lifters that selectively operate intake valves in first and second lift modes. The first intake air pressure may correspond to an intake stroke of a first piston of the engine when the engine is commanded to operate in the first lift mode and the second intake air pressure may correspond to an intake stroke of a second piston of the engine when the engine is commanded to operate in the first lift mode. The method may further include determining a difference between the first and second intake air pressures and diagnosing an intake valve lifter failure when the difference exceeds a predetermined limit.

20 Claims, 3 Drawing Sheets

U.S. PATENT DOCUMENTS

| | | | |
|---|---|---|---|
| 7,314,028 B2* | 1/2008 | Yasui et al. | 123/90.16 |
| 7,373,238 B2* | 5/2008 | Hakariya et al. | 701/103 |
| 7,387,018 B2* | 6/2008 | Wiles | 73/114.39 |
| 7,444,236 B2* | 10/2008 | Wiles | 701/114 |
| 7,513,228 B2* | 4/2009 | Hiyoshi et al. | 123/90.16 |
| 2002/0152017 A1* | 10/2002 | Russell et al. | 701/110 |
| 2004/0261767 A1* | 12/2004 | Sawada et al. | 123/406.53 |
| 2005/0154522 A1* | 7/2005 | Fuwa et al. | 701/107 |
| 2005/0205055 A1* | 9/2005 | Shimizu | 123/346 |
| 2005/0205057 A1* | 9/2005 | Yamashita | 123/406.58 |
| 2006/0037569 A1* | 2/2006 | Minami et al. | 123/90.15 |
| 2006/0047350 A1* | 3/2006 | Yasui et al. | 700/54 |
| 2007/0163258 A1 | 7/2007 | Narita et al. | |
| 2007/0239343 A1* | 10/2007 | Okubo et al. | 701/105 |
| 2007/0244625 A1* | 10/2007 | Hakariya et al. | 701/105 |
| 2009/0084333 A1* | 4/2009 | Cleary et al. | 123/90.17 |
| 2010/0175644 A1* | 7/2010 | Shinagawa et al. | 123/90.15 |

\* cited by examiner

MULTI-STEP VALVE LIFT FAILURE MODE DETECTION

FIELD

The present disclosure relates to engine valvetrain diagnostics, and more specifically to a valve lifter system diagnostic.

BACKGROUND

The statements in this section merely provide background information related to the present disclosure and may not constitute prior art.

Engine assemblies typically include intake and exhaust valves that are actuated by valve lifters. The valve lifters may be operable in multiple modes to provide varying lift durations for the intake and exhaust valves in order to improve engine performance, such as increasing fuel economy and power output. Operating parameters of the engine may be adjusted based on the actual operating mode of the valve lifters. Engine performance may be reduced if the valve lifters do not transition to a commanded mode.

SUMMARY

A method of valve lift failure detection may include determining first and second intake air pressures in an engine having intake valve lifters that selectively operate intake valves in first and second lift modes. The first intake air pressure may correspond to an intake stroke of a first piston of the engine when the engine is commanded to operate in the first lift mode and the second intake air pressure may correspond to an intake stroke of a second piston of the engine when the engine is commanded to operate in the first lift mode. The method may further include determining a difference between the first and second intake air pressures and diagnosing an intake valve lifter failure when the difference exceeds a predetermined limit.

A control module may include an intake air pressure determination module, an intake air pressure comparison module, and a lifter failure determination module. The intake air pressure determination module may determine first and second intake air pressures in an engine having intake valve lifters that selectively operate intake valves in first and second lift modes. The first intake air pressure may correspond to an intake stroke of a first piston of the engine when the engine is commanded to operate in the first lift mode and the second intake air pressure may correspond to an intake stroke of a second piston of the engine when the engine is commanded to operate in the first lift mode. The intake air pressure comparison module may be in communication with the intake air pressure determination module and may determine a difference between the first and second intake air pressures. The lifter failure determination module may be in communication with the intake air pressure comparison module and may diagnose a lifter failure when the difference exceeds a predetermined limit.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
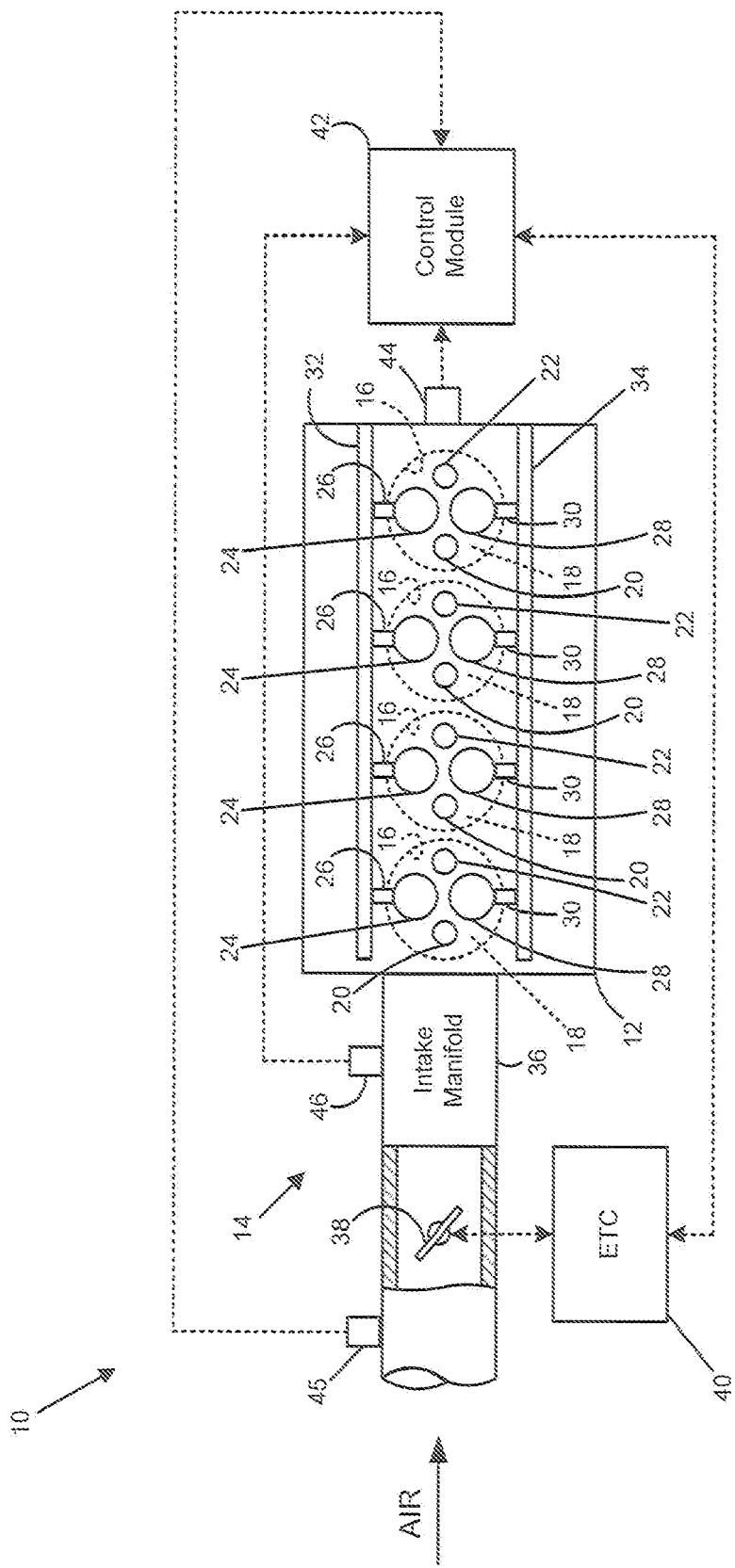
FIG. 1 is a schematic illustration of a vehicle according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle 10 is schematically illustrated. Vehicle 10 may include an engine 12 in communication with an intake system 14. Engine 12 may include a plurality of cylinders 16 having pistons 18 disposed therein. Engine 12 may further include a fuel injector 20, a spark plug 22, an intake valve 24, an intake valve lifter 26, an exhaust valve 28, and an exhaust valve lifter 30 for each cylinder 16, as well as intake and exhaust camshafts 32, 34. Intake and exhaust camshafts 32, 34 may be engaged with intake and exhaust valve lifters 26, 30 to actuate opening and closing of intake and exhaust valves 24, 28. Intake and exhaust valve lifters 26, 30 may each include multi-step lifters.

Intake valve lifter 26 may include a two-step valve lifter selectively operable in first and second modes. The first mode may provide a first lift duration and the second mode may provide a second lift duration for intake valve 24. Intake valve lifter 26 may include a hydraulically actuated device that switches intake lifter 26 between the first and second modes based on a fluid pressure, such as an oil pressure supplied thereto. The first mode may correspond to a low lift mode and the second mode may correspond to a high lift mode. The high lift mode may include a greater displacement of intake valve 24 relative to the low lift mode, resulting in a greater open duration for intake valve 24.

Intake system 14 may include an intake manifold 36 and a throttle 38 in communication with an electronic throttle control (ETC) 40. Throttle 38 and intake valves 24 may control an air flow into engine 12. Fuel injector 20 may control a fuel flow into engine 12 and spark plug 22 may ignite the air/fuel mixture provided to engine 12 by intake system 14 and fuel injector 20.

Vehicle 10 may additionally include a control module 42. Control module 42 may be in communication with electronic throttle control 40 to control throttle 38. Control module 42 may additionally be in communication with an engine speed sensor 44 to determine an operating speed of engine 12, a mass air flow (MAF) sensor 45 to determine a mass air flow into engine 12, and a manifold absolute pressure (MAP) sensor 46 to determine an intake air pressure. Control module 42 may control operation of intake valve lifters 26 and may command transitions between the low and high lift modes. For example, control module 42 may control an oil control valve (not shown) to control an oil pressure provided to intake valve lifters 26. As discussed above, the oil pressure may be used to actuate the intake valve lifters 26.

Figure 2:
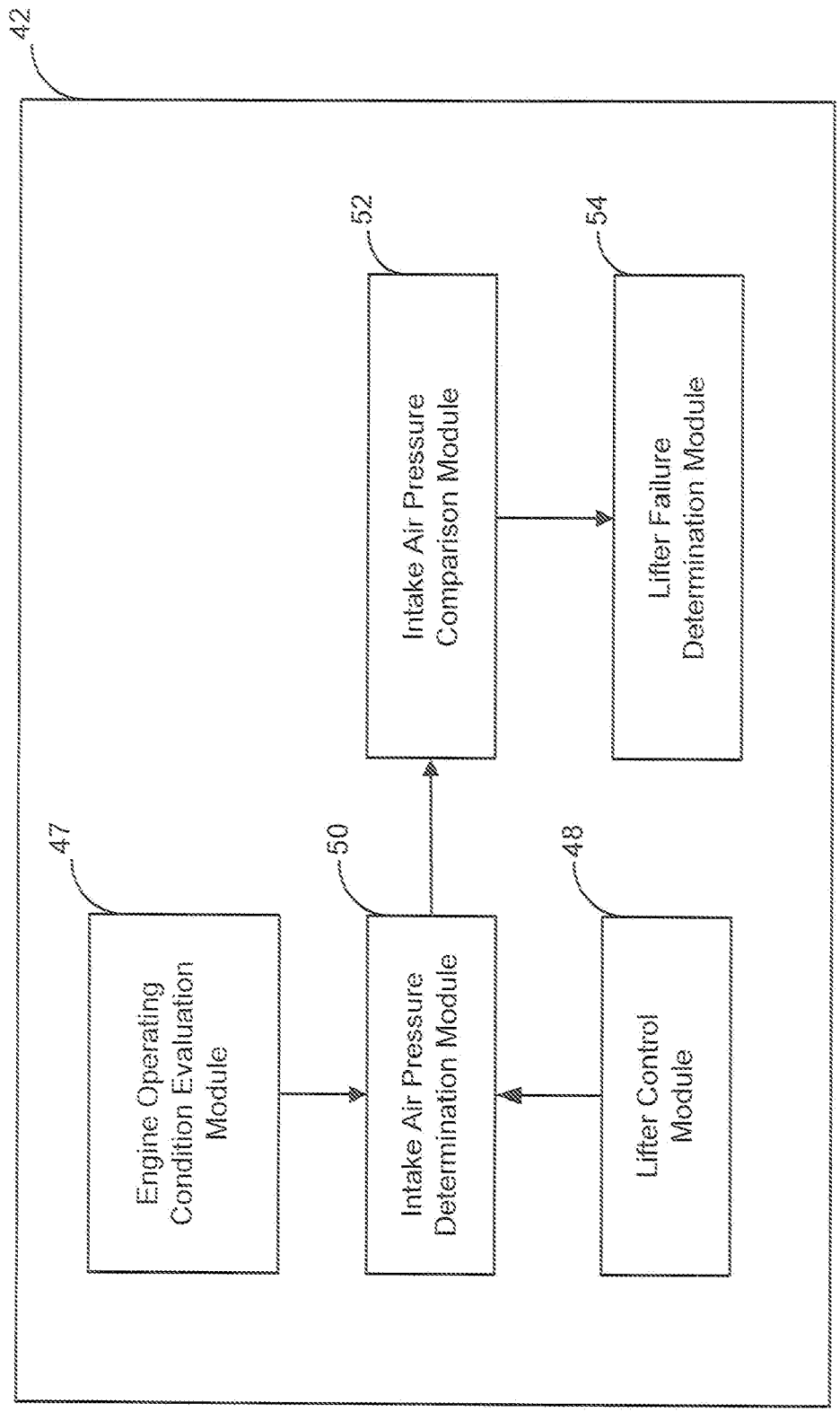
FIG. 2 is a control block diagram of the control module shown in FIG. 1.

With additional reference to FIG. 2, control module 42 may include an engine operating condition evaluation module 47, a lifter control module 48, an intake air pressure determination module 50, an intake air pressure comparison module 52, and a lifter failure determination module 54. Engine operating condition evaluation module 47 may be in communication with engine speed sensor 44 and MAF sensor 45. Engine operating condition evaluation module 47 may determine when engine 12 is operating in a steady-state condition. A steady-state operating condition of engine 12 may include engine operating conditions where engine 12 is operating at a generally constant speed and intake air flow rate, such as conditions where a user input is not adjusting the position of throttle 38.

Lifter control module 48 may determine a desired intake valve lift mode, such as low or high lift, and may command the desired lift mode. As discussed above, the desired lift mode may be commanded by actuating an oil control valve. Lifter control module 48 may be in communication with intake air pressure determination module 50 and may provide the commanded intake valve lift mode to intake air pressure determination module 50.

Intake air pressure determination module 50 may determine an intake air pressure corresponding to the intake stroke of each of pistons 18. More specifically, intake air pressure determination module 50 may receive a signal from MAP sensor 46 indicative of the manifold absolute pressure corresponding to the intake stroke of each of pistons 18. The intake air pressure determination may occur at approximately a bottom dead center (BDC) position of pistons 18 during the intake strokes thereof. Intake air pressure determination module 50 may calculate and store a running average for intake air pressures associated with each of cylinders 16.

Intake air pressure comparison module 52 may be in communication with intake air pressure determination module 50 and may receive intake air pressure values associated with each of cylinders 16 therefrom. The intake air pressure values received from intake air pressure determination module 50 may include the running averages associated with each of cylinders 16. Intake air pressure comparison module 52 may compare the intake air pressure value associated with one of cylinders 16 with the intake air pressure value associated with another of cylinders 16. More specifically, intake air pressure comparison module 52 may compare the intake air pressure values associated with each of cylinders 16 with the intake air pressure values associated with each of the other cylinders 16. Intake air pressure comparison module 52 may determine differences between the various intake air pressure values.

Lifter failure determination module 54 may be in communication with intake air pressure comparison module 52. Lifter failure determination module 54 may receive the differences determined by intake air pressure comparison module 52 and may evaluate the differences relative to a predetermined limit. Lifter failure determination module 54 may diagnose a failure of one of intake valve lifters 26 when a difference exceeds the predetermined limit.

Figure 3:
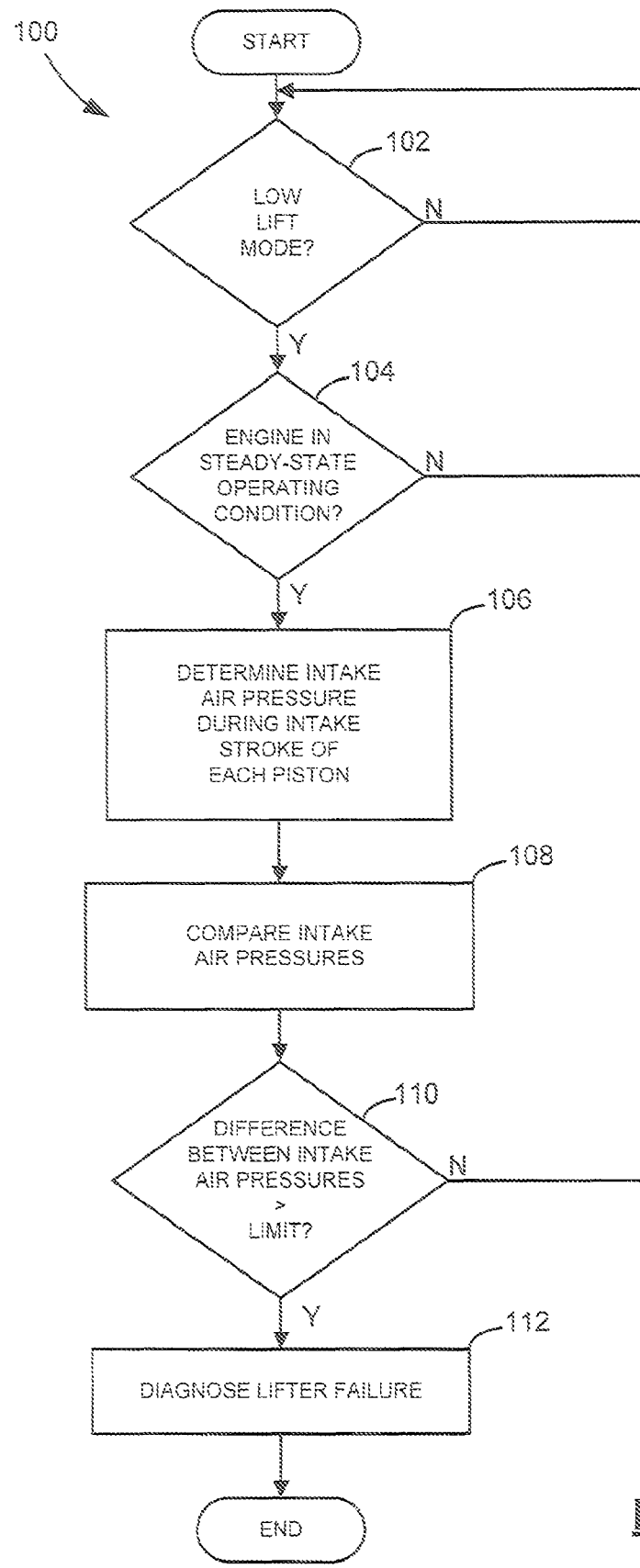
FIG. 3 is a flow diagram illustrating steps for control of the vehicle of FIG. 1.

With reference to FIG. 3, control logic 100 for the determination of an intake valve lifter failure is illustrated. Control logic 100 may begin at block 102 where lifter control module 48 determines whether intake valve lifters 26 have been commanded to a low lift mode. If intake valve lifters 26 have been commanded to a low lift mode, control logic 100 may proceed to block 104. Otherwise, control logic 100 may return to block 102.

Block 104 may determine an engine operating condition using engine operating condition evaluation module 47. If engine 12 is in a steady-state operating condition, control logic 100 may proceed to block 106. Otherwise, control logic 100 may return to block 102. During steady-state operation of engine 12, manifold absolute pressure may be generally constant.

Intake air pressure determination module 50 may determine intake air pressure during the intake stroke of each of pistons 18 at block 106. Determination of the intake air pressures may include an intake air pressure corresponding to each of cylinders 16. For example, in a four cylinder engine (as shown in FIG. 1), intake air pressures ($P_1$, $P_2$, $P_3$, $P_4$) may be determined by MAP sensor 46 corresponding to a BDC condition of pistons 18 within each of the four cylinders 16.

Intake air pressures ($P_1$, $P_2$, $P_3$, $P_4$) may be determined for each intake stroke of each piston 18 during operation in the low lift mode. Running averages ($P_{AVG\_1}$, $P_{AVG\_2}$, $P_{AVG\_3}$, $P_{AVG\_4}$) may be calculated based on intake air pressures ($P_1$, $P_2$, $P_3$, $P_4$) and stored in intake air pressure determination module 50 throughout operation of engine 12 in the low lift mode. Running averages ($P_{AVG\_1}$, $P_{AVG\_2}$, $P_{AVG\_3}$, $P_{AVG\_4}$) may be reset after an engine re-start or after a transition to high lift mode operation of intake valve lifters 26. Control logic 100 may then proceed to block 108 where intake air pressures are compared.

Intake air pressure comparison module 52 may compare intake air pressures at block 108. Comparison of intake air pressures may include a comparison of the running averages ($P_{AVG\_1}$, $P_{AVG\_2}$, $P_{AVG\_3}$, $P_{AVG\_4}$) corresponding each of cylinders 16. Running average ($P_{AVG\_1}$) may be compared to running averages ($P_{AVG\_2}$, $P_{AVG\_3}$, $P_{AVG\_4}$) by calculating differences ($\Delta P_{2\_1}$, $\Delta P_{3\_1}$, $\Delta P_{4\_1}$), where:

$$\Delta P_{2\_1} = P_{AVG\_2} - P_{AVG\_1};$$

$$\Delta P_{3\_1} = P_{AVG\_3} - P_{AVG\_1}; \text{ and}$$

$$\Delta P_{4\_1} = P_{AVG\_4} - P_{AVG\_1}.$$

Running average ($P_{AVG\_2}$) may be compared to running averages ($P_{AVG\_1}$, $P_{AVG\_3}$, $P_{AVG\_4}$) by calculating differences ($\Delta P_{1\_2}$, $\Delta P_{3\_2}$, $\Delta P_{4\_2}$), where:

$$\Delta P_{1\_2} = P_{AVG\_1} - P_{AVG\_2};$$

$$\Delta P_{3\_2} = P_{AVG\_3} - P_{AVG\_2}; \text{ and}$$

$$\Delta P_{4\_2} = P_{AVG\_4} - P_{AVG\_2}.$$

Running average ($P_{AVG\_3}$) may be compared to running averages ($P_{AVG\_1}$, $P_{AVG\_2}$, $P_{AVG\_4}$) by calculating differences ($\Delta P_{1\_3}$, $\Delta P_{2\_3}$, $\Delta P_{4\_3}$), where:

$$\Delta P_{1\_3} = P_{AVG\_1} - P_{AVG\_3};$$

$$\Delta P_{2\_3} = P_{AVG\_2} - P_{AVG\_3}; \text{ and}$$

$$\Delta P_{4\_3} = P_{AVG\_4} - P_{AVG\_3}.$$

Running average ($P_{AVG\_4}$) may be compared to running averages ($P_{AVG\_1}$, $P_{AVG\_2}$, $P_{AVG\_3}$) by calculating differences ($\Delta P_{1\_4}$, $\Delta P_{2\_4}$, $\Delta P_{3\_4}$), where:

$$\Delta P_{1\_4} = P_{AVG\_1} - P_{AVG\_4};$$

$$\Delta P_{2\_4} = P_{AVG\_2} - P_{AVG\_4}; \text{ and}$$

$$\Delta P_{3\_4} = P_{AVG\_3} - P_{AVG\_4}.$$

It is understood that the above description applies equally to engines including more or fewer than four cylinders.

Control logic 100 may then proceed to block 110 where differences ($\Delta P_{1\_2}$, $\Delta P_{1\_3}$, $\Delta P_{1\_4}$, $\Delta P_{2\_1}$, $\Delta P_{2\_3}$, $\Delta P_{2\_4}$, $\Delta P_{3\_1}$, $\Delta P_{3\_2}$, $\Delta P_{3\_4}$, $\Delta P_{4\_1}$, $\Delta P_{4\_2}$, $\Delta P_{4\_3}$) are evaluated relative to a predetermined limit. If any of the differences are positive and above the predetermined limit, control logic 100 may proceed to block 112, where an intake valve lifter failure is diagnosed using lifter failure determination module 54.

A positive difference value may generally indicate a greater opening duration for a given intake valve lifter 26 relative to the other intake valve lifters. More specifically, a positive difference value that is above the predetermined limit may generally indicate an intake valve lifter 26 that has remained is in the high lift mode after being commanded to the low lift mode. Comparing intake air pressures associated with each cylinder 16 to each of the other intake air pressures associated with the other cylinders 16 may provide for detection of multiple failed intake valve lifters 26. The predetermined limit may generally distinguish a failed intake valve lifter 26 from normal intake air pressure oscillations.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method comprising:
   determining a first intake air pressure in an engine corresponding to an intake stroke of a first piston when an engine valve lifter system is commanded to operate in a first lift mode;
   determining a second intake air pressure in said engine corresponding to an intake stroke of a second piston when said valve lifter system is commanded to operate in said first lift mode;
   determining a first difference between said first and second intake air pressures; and
   diagnosing, using a lifter failure determination module, a valve lifter system failure when said first difference exceeds a predetermined limit.

2. The method of claim 1, wherein said valve lifter system includes a first intake valve lifter associated with said first piston and a second intake valve lifter associated with said second piston, said diagnosing including diagnosing a failure of said first intake valve lifter when said second intake air pressure exceeds said first intake air pressure by said predetermined limit.

3. The method of claim 2, wherein said failure includes a first intake valve operating in a second lift mode after said valve lifter system is commanded to operate in said first lift mode.

4. The method of claim 3, wherein said first lift mode is a low lift mode and said second lift mode is a high lift mode.

5. The method of claim 1, wherein said first and second intake air pressures are intake manifold air pressures.

6. The method of claim 1, wherein said first intake air pressure is determined when said first piston is at approximately a bottom dead center position of said intake stroke thereof and said second intake air pressure is determined when said second piston is at approximately a bottom dead center position of said intake stroke thereof.

7. The method of claim 1, wherein said determining said first and second intake air pressures and said difference occurs when said engine is operating at a steady-state condition.

8. The method of claim 7, further comprising determining a plurality of additional intake air pressures corresponding to intake strokes of a plurality of additional pistons and determining a plurality of additional differences between said first intake air pressure and each of said plurality of additional intake air pressures.

9. The method of claim 8, wherein said diagnosing includes diagnosing a failure of a first intake valve lifter associated with said first piston when any of said second intake air pressure and one of said plurality of intake air pressures exceeds said first intake air pressure by said predetermined limit.

10. The method of claim 1, wherein said determining a first intake air pressure includes determining a first running average of said first intake air pressure while said valve lifter system is commanded to operate in said first lift mode and said determining a second intake air pressure includes determining a second running average of said second intake air pressure while said valve lifter system is commanded to operate in said first lift mode, said first difference including a difference between said first and second running averages.

11. A control module comprising:
    an intake air pressure determination module that determines first and second intake air pressures in an engine having intake valve lifters that selectively operate intake valves in first and second lift modes, said first intake air pressure corresponding to an intake stroke of a first piston of said engine when said engine is commanded to operate in said first lift mode and said second intake air pressure corresponding to an intake stroke of a second piston of said engine when said engine is commanded to operate in said first lift mode;
    an intake air pressure comparison module in communication with said intake air pressure determination module that determines a difference between said first and second intake air pressures; and
    a lifter failure determination module in communication with said intake air pressure comparison module that diagnoses a lifter failure when said difference exceeds a predetermined limit.

12. The control module of claim 11, wherein said intake valve lifters include a first intake valve lifter associated with said first piston and a second intake valve lifter associated with said second piston, said lifter failure determination module diagnosing a failure of said first intake valve lifter when said second intake air pressure exceeds said first intake air pressure by said predetermined limit.

13. The control module of claim 12, wherein said failure includes said first intake valve operating in said second lift mode after said engine is commanded to operate in said first lift mode.

14. The control module of claim 11, wherein said first and second intake air pressures are intake manifold air pressures.

15. The control module of claim 11, wherein said first intake air pressure is determined when said first piston is at approximately a bottom dead center position of said intake stroke thereof and said second intake air pressure is determined when said second piston is at approximately a bottom dead center position of said intake stroke thereof.

16. The control module of claim 11, further comprising an engine operating condition evaluation module in communication with said intake air pressure determination module that determines when said engine is operating at a steady-state condition, said intake air pressure determination module determining said first and second intake air pressures when said engine is operating at a steady-state condition.

17. The control module of claim 16, wherein said intake air pressure determination module determines a plurality of additional intake air pressures in said engine corresponding to intake strokes of a plurality of additional pistons of said engine and said intake air pressure comparison module determines a plurality of additional differences between said first intake air pressure and each of said plurality of additional intake air pressures.

18. The control module of claim 17, wherein said lifter failure determination module diagnoses a failure of a first of said intake valve lifters associated with said first piston when any of said second intake air pressure and one of said plurality of intake air pressures exceeds said first intake air pressure by said predetermined limit.

19. The control module of claim 11, wherein said intake air pressure determination module determines a first running average of said first intake air pressure during engine operation in said first lift mode and a second running average of said second intake air pressure during engine operation in said first lift mode, said difference determined by said intake air pressure comparison module including a difference between said first and second running averages.

20. The control module of claim 11, wherein said first lift mode is a low lift mode and said second lift mode is a high lift mode.

* * * * *